(12) United States Patent
Kish et al.

(10) Patent No.: US 9,894,033 B2
(45) Date of Patent: Feb. 13, 2018

(54) DNS-ENABLED COMMUNICATION BETWEEN HETEROGENEOUS DEVICES

(71) Applicant: Fortinet, Inc., Sunnyvale, CA (US)

(72) Inventors: William A Kish, Millerton, NY (US); Sergey Katsev, Pleasant Valley, NY (US)

(73) Assignee: Fortinet, Inc., Sunnyvale, CA (US)

( * ) Notice: Subject to any disclaimer, the term of this patent is extended or adjusted under 35 U.S.C. 154(b) by 309 days.

(21) Appl. No.: 14/451,106

(22) Filed: Aug. 4, 2014

(65) Prior Publication Data

US 2016/0036943 A1 Feb. 4, 2016

(51) Int. Cl.
*G06F 15/16* (2006.01)
*H04L 29/12* (2006.01)

(52) U.S. Cl.
CPC ...... *H04L 61/6013* (2013.01); *H04L 61/1511* (2013.01); *H04L 61/6059* (2013.01); *H04L 61/6086* (2013.01)

(58) Field of Classification Search
CPC .............. H04L 61/251; H04L 61/2514; H04L 61/1511; H04L 29/12358; H04L 29/12367
USPC ........................................................ 709/203
See application file for complete search history.

(56) References Cited

U.S. PATENT DOCUMENTS

| | | | | |
|---|---|---|---|---|
| 7,526,562 B1* | 4/2009 | Samprathi | ......... | H04L 29/12066 370/466 |
| 2014/0258491 A1* | 9/2014 | Forristal | ............... | H04L 45/741 709/223 |
| 2015/0074221 A1* | 3/2015 | Kuparinen | ........ | H04L 29/12066 709/214 |

* cited by examiner

*Primary Examiner* — Wing F Chan
*Assistant Examiner* — Andrew Woo
(74) *Attorney, Agent, or Firm* — Hamilton, DeSanctis & Cha LLP (57) ABSTRACT

Methods and systems for an IPv4-IPv6 proxy mode for DNS servers are provided. According to one embodiment, a DNS query is received by a network device from a dual-stack client. A determination is made the network device whether a first record type containing an Internet Protocol (IP) address for a server associated with the query exists within a DNS database of the network device. If the first record type exists for the server, then communication is enabled between the client and the server based on the first record type; otherwise it is automatically determined whether a second record type usable by the client exists for the server. Responsive to a determination that the second record type exists, data associated with the second record type is shared with the client by the network device to enable communication between the client and the server.

13 Claims, 9 Drawing Sheets

FIG.9

US 9,894,033 B2

DNS-ENABLED COMMUNICATION BETWEEN HETEROGENEOUS DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present disclosure generally relate to a network device that facilitates communication between heterogeneous devices. More particularly, the disclosure relates to systems and methods implemented in an intermediate network device for realizing communication between devices/systems that are typically incompatible with each other with respect to, for instance, their use of different network layer protocols.

Description of the Related Art

Every device on an Internet Protocol (IP) network is given a unique identity by assigning an IP address to it. For a particular network device, such as a client device, to communicate with other network devices or web servers within a network, the device must have a unique IP address. IP protocol version 4 (IPv4), defined by RFC-791, specifies 32 bits for the IP address, which theoretically gives about 4,294,967,296 unique IP addresses. However, there are actually only between 3.2 and 3.3 billion available IP addresses since the address space is separated into classes and some addresses are set aside for multicasting, testing and other special uses. As more and more devices are becoming Internet enabled, the number of IP addresses available via IPv4 is insufficient for assigning unique IP addresses to all these devices.

It is expected that the number of available IPv4 address will be exhausted in the near future. To address this issue, the Internet Engineering Task Force (IETF) proposed a solution by introducing an Internet Protocol Version 6 (IPv6), which is defined by RFC-2460. IPv6 is intended to replace IPv4, which still carries the vast majority of Internet traffic. Introduction of IPv6 provides 128 bits for the IP address, which increases the pool of available IP addresses.

A majority of present day devices are still using IPv4. One of the reasons for this is the fact that the proposed IPv6 protocol is not backward compatible with IPv4, meaning that the IPv6 devices cannot directly communicate with IPv4 devices. As such, aside from dual stack devices that support communication over both IPv4 and IPv6, the IPv4 and IPv6 networks are effectively two separate Internets. If a client only has an IPv4 address, it is not able to communicate over IPv6, and vice versa.

Typically, in order to facilitate communication between two devices, a first device (e.g., a client) performs a Domain Name System (DNS) query to a DNS server to obtain an IP address of a second device (e.g., a particular server) with which the client device wishes to communicate. The DNS server, translates the more easily human-readable and memorizable text-based domain names, such as www.xyz-.com, to their respective corresponding numerical IP addresses, such as 192.168.92.10, needed for the purpose of locating computer services and devices worldwide, wherein the DNS is an essential component of the functionality of the Internet and maintains a mapping between domain names and their corresponding IP addresses.

Once the IP address of a particular server is obtained by the client from the DNS device, the client can then attempt to communicate with the particular server directly using the obtained IP address. The client is configured with its own IP address, which it uses to identify itself to the server when communicating with such server. A problem occurs, however, when a client sends a DNS query for an "AAAA" record (which is associated with an IPv6 address) and the DNS server does not have an "AAAA" record for the specified host system. However, it is possible that the DNS server may have an "A" record (which is associated with an IPv4 address) for the specified host system. At present, a DNS query for an "AAAA" record of a host system having only an IPv4 presence or a DNS query for an "A" record of a host system having only an IPv6 presence results in the DNS server responding that there is no IP information for the specified host system. However, it is possible that the DNS server actually has a record for the other type of record (e.g., "A" and "AAAA," respectively), but the DNS server does not return the other record.

Also, at present, in order to enable bidirectional communication, it is required that both the client and the server use the same protocol, i.e. both are either IPv4 compliant or both are IPv6 compliant. For instance, if the client device is an IPv4 device and the server device is an IPv6 device, they will not be able to communicate as they both need to use the same IP address version in order to communicate with each other. If a client is a single stack IPv4 device, it will not able to communicate with a second device that is using IPv6, and vice-versa. There is therefore a need for an enhanced/improved/modified intermediate network device that facilitates packet translation from IPv4 to IPv6 and visa-versa to enable communications between heterogeneous devices using different network layer protocols (e.g., between IPv4 devices and IPv6 devices).

SUMMARY

Methods and systems are described for an IPv4-IPv6 proxy mode for DNS servers. According to one embodiment, a method is provided for realizing communication between a dual-stack client device and a server device. A DNS query is received by a network device from the dual-stack client device. It is determined by the network device whether a first record type containing an Internet Protocol (IP) address for the server device exists within a DNS database of the network device. Communication is enabled between the dual-stack client device and the server device based on the first record type if the first record type exists for the server device within the DNS database. Responsive to a determination that the first record type does not exist for the server device within the DNS database, an automatic determination is made by the network device whether a second record type usable by the dual-stack client device exists for the server device. Responsive to a determination that the second record type exists, data associated with the second record type is shared with the dual-stack client device by the network device to enable communication between the dual-stack client device and the server device.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Methods and systems are described for an IPv4-IPv6 proxy mode for DNS servers. An aspect of the present disclosure relates to a method for realizing communication between a dual-stack first device and a second device, wherein the method includes a step of receiving, at a network device, a query from the dual-stack first device, wherein the query is for a first record type that identifies an Internet Protocol (IP) address of the second device. The method further comprises determining whether the first record type for the second device exists, and if the record exists, enabling communication between the first device and the second device based on the first record type; otherwise, the method further comprises the step of determining at the network device, whether a second record type that the first device is compliant to, exists for the second device. Such determination can be made when the first record type does not exist for the second device. In an aspect, in case the second record type is found for the second device, the method can further include sharing, at the network device, the second record type data with the first device to enable communication between the first device and the second device.

In another aspect, the record type of the present disclosure can include an A type record, and an AAAA type record. In another aspect, a dual-stack device can be configured to be compliant with both IPv4 and IPv6 protocols. In another aspect, the network device can be selected from one or more of a DNS server, a firewall, a proxy server, a router, a load balancer, a local cache device, and a wireless gateway device.

In another aspect, the present disclosure includes a method for realizing communication between a single-stack first device and a second device (say a single-stack second device) includes the step of receiving, at a network device, a request from the single-stack first device for accessing the second device, wherein the first device can be compliant to a first protocol type. The method can further include determining, at the network device, IP address of the second device, wherein the IP address of the second device is compliant to a second protocol type. The method can further include evaluating, at the network device, whether the first protocol type is same as the second protocol type, wherein in case the first protocol type is same as the second protocol type, direct communication between the first device and second device can be enabled, wherein in case the first protocol type is not same as the second protocol type, a first proxy IP address can be selected at the network device, wherein the first proxy IP address is of the first protocol type and a second proxy IP address can be selected at the network device, wherein the second proxy IP address is of the second protocol type. Such a configuration can then enable communication between the first device and the second device by means of allowing communication between the first device and the network device through the first proxy IP address using the first protocol type, and allowing communication between the network device and the second device through the second proxy IP address using the second protocol type.

In an exemplary implementation of the above embodiment, the method can further include receiving, at the first proxy IP address of the network device, a packet intended for the second device from the first device, and transforming, at the network device, the packet that is compliant to the first protocol type to a transformed packet compliant to the second protocol type. Such transformed packet can then be forwarded from the second proxy IP address of the network device to the second device. The method can further include receiving, at the second proxy IP address of the network device, a reply packet from the second device, and transforming, at the network device, the reply packet that is compliant to the second protocol type to a transformed reply packet compliant to the first protocol type such that the transformed reply packet can be forwarded from the first proxy IP address of the network device to said first device.

In an exemplary implementation, a network device of the present disclosure can be configured to maintain a pool of IPv4 and IPv6 IP addresses and issue/configure one or more proxy IP address(es) that are compatible to first/second device such that, for instance, the first device uses the first proxy IP address assuming it to be the real IP address of the second/destination device.

In the following description, numerous specific details are set forth in order to provide a thorough understanding of embodiments of the present invention. It will be apparent to one skilled in the art that embodiments of the present invention may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary, non-limiting embodiments of the present invention are described more fully below with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any of those called out.

Exemplary implementations of the present disclosure described herein relate to systems and methods for enabling communication between heterogeneous devices that work on different Internet Protocols (IPs), such as one working being IPv4 compliant and the other being IPv6 compliant. Exemplary implementations of the present disclosure include a network device configured to provide a modified DNS, which may also act as a proxy device, to facilitate communication between heterogeneous device using different network layer IP addressing protocols.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 1A:
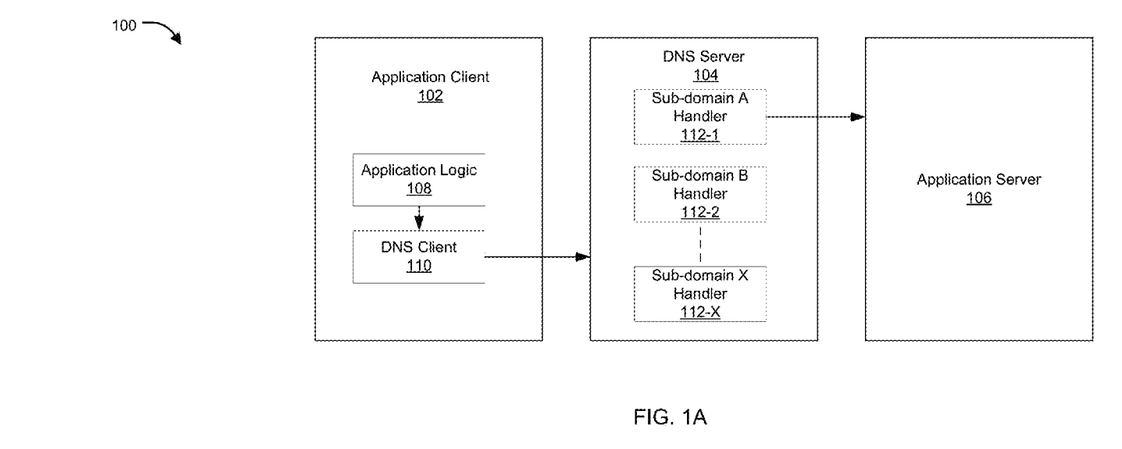
FIGS. 1A and 1B illustrate an exemplary network architecture comprising IPv6 and IPv4 compatible devices in accordance with an embodiment of the present disclosure.
Figure 1B:
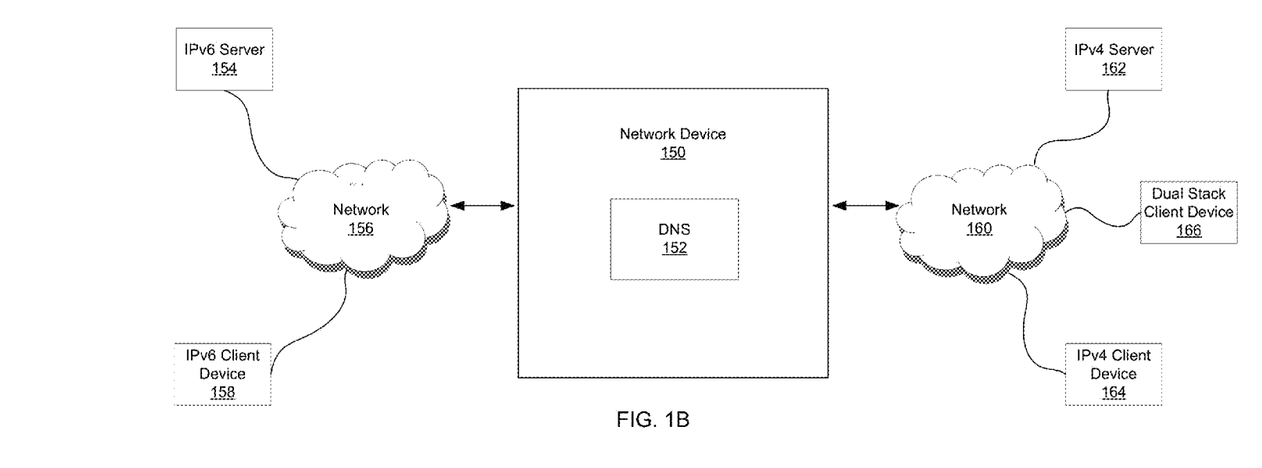

FIGS. 1A and 1B illustrate exemplary network architectures, which may be collectively and individually referred to as architecture(s) 100, comprising IPv6 and IPv4 compatible devices in accordance with an embodiment of the present disclosure. Architectures 100 represent exemplary deployment networks in which embodiments of the present invention may be implemented. In an aspect, FIGS. 1A and 1B represent client devices and application servers that may be configured to communicate in accordance with different versions of IP and have incompatible IP addresses. For instance, a client device may be using an IPv4 address, whereas the application server may be using an IPv6 address, or vice versa.

FIG. 1A illustrates an exemplary network scenario having an application client 102 running application logic 108 and being configured with/coupled to a DNS client 110 in order to use a DNS server 104 to process requests through an application server 106. Client device 102, such as a laptop, PC, tablet PC, mobile phone, among any other like client devices 102 can send a request through DNS client 110 to DNS server 104, which can then resolve the request and provide the IP address of application server 106 back to client 102. In an instance, when a user, through the application client 102 tries to access www.xyz.com hosted on server 106, application logic 108 and DNS client 110, running on application client 102, can configure a request to be sent to DNS server 104 for the IP address of application server 106. In a complex real-time network deployment, there could be several application devices, which may be collectively referred to as application clients 102, a number of DNS servers, which may be collectively referred to as DNS servers 104, and multiple application servers, which may be collectively referred to as application servers 106. Network connections between application client 102, DNS server 104, and application server 106 may be wired and/or wireless.

In an example implementation, application client 102 can be implemented in hardware, software, or combination of both so as to enable client 102 to send/issue out a DNS query and/or a DNS command, and also process a return/reply to the query that may be received in a predefined Resource Record format. Some useful types of Resource Records include A (AAAA or A6 for IPv6), SRV, and CNAME which returns an IP, host and port, and a name, respectively. These are particularly useful for applications that expect results that are essentially in the form of network resources. DNS server 104 may respond back with a response code (RCODE) in a DNS header, which is a 4 bit field, wherein values between 0 and 5 are defined as "No error", "Format error", "Server failure", "Name Error", "Not Implemented", and "Refused" respectively, with values between 6 and 15 being reserved for future use.

In an aspect, when DNS server 104 receives a DNS command, server 104 checks its database as to whether the request corresponds to a name it understands. If the name database of DNS server 104 has details of a corresponding name, it returns a DNS record containing the IP address, for example, of application server 104. DNS server 104 can also include one or more sub-domain handlers such as sub-domain A handler 112-1, sub-domain B handler 112-2, . . . , sub-domain X handler 112-3, which may be collectively referred to as sub-domain handlers 112, which resolve the DNS query pertaining to a particular sub-domain. In an implementation, once a DNS request is received from client 102 for server 106, DNS server 104 can assign the request to a suitable handler for resolving the request/query, wherein the handler can then load the appropriate database and invoke the proper module to process the request accordingly and pass back the response having the IP address of server 106, to application client. In an implementation, a single handler may be responsible for handling DNS queries for a single application server 106, or may be configured to handle multiple application servers 106.

FIG. 1B illustrates another exemplary deployment network architecture in which embodiments of the present disclosure can be incorporated. Architecture illustrates a network device 150 that is operatively coupled with multiple client devices, such as IPv6 client device 158, IPv4 client device 164, and a dual-stack client device 166 (compatible with both IPv4 and IPv6 protocol formats) through networks such as network 156 and network 160. Network device 150 can further be operatively coupled with multiple servers, such as IPv6 server 154, and IPv4 server 162. Therefore, different client devices/servers having different IP Protocol formats can be configured, creating a heterogeneous network environment. Network device 150 can further include a DNS 152 configured to process access requests from different client devices and give back IP addresses of the requested network resources/applications/servers to the requesting client devices.

In the above construction, in a typical and existing scenario, when an IPv4 compatible client device, such as device 164, issues a request for a network resource, such as server 154, which is IPv6 compliant, DNS 152 of network device 150 would not be able to process the request due to incompatibility between the protocol formats. Similarly, DNS 152 would also not be able to process a request from device 158 to access resources from server 162 due to incompatibility between the protocol formats. Homogeneous devices, such as 158-154 and 164-162, however would be able to access each other and process respective requests.

In an aspect of the present disclosure, network device 150 can be configured with a proxy service (not shown) such that when device 150 identifies that IP format of the requesting device is different from that of the requested device, the proxy service can be initiated to generate a first proxy IP address to interact with the requester in requester's IP format, and generate a second proxy IP address to interact with the requested device's in its respective IP format. In such a case, the network device 150 can be configured to convert the format of each request received by the first proxy IP address from the requester into the format of second proxy IP address so that the request can be sent to the requested device in its compatible IP format.

In another aspect of the present disclosure, network device 150 can further be configured to receive an access request, in a first IP format (say, IPv4 format), from a dual-stack client device, such as device 166, wherein device 150, in such a case, can check if the IP format of the requested device is same as that of the first IP format, wherein when the IP formats do not match, the network device 150 can automatically retrieve an IP address of the requested device, in a second IP format (say, IPv6 format), and return the retrieved IP address to device 166, thereby allowing device 166 to interact with the requested device as device 166 has a dual-stack and is therefore compatible with both IPv6 as well as IPv4 formats.

Those skilled in the art will appreciate that IP format, protocol format, record type, Internet Protocol format, among other like terms, are used interchangeably herein to reflect the network protocol incompatibility issues attempted to be addressed by embodiments of the present invention. For instance, network device 150 can be configured, for each request from a requesting client device, to retrieve a record type of the requested device and return same to the requesting device. In the context of the above-mentioned embodiment of a dual-stack client device, if an initial request is received from the client device for an "AAAA" record for a domain name say "www.xyz.com", device 150 can check if an AAAA record exists for the domain name; and, if so, return it along with the IP address of the domain name. Otherwise, if an AAAA record does not exist for the domain name, device 150 can automatically check if the domain name www.xyz.com has an "A" record, which if found, can be sent back/returned to the requesting client device, so that the client device, being dual-stack, can interact with the domain name using the "A" record.

Figure 2:
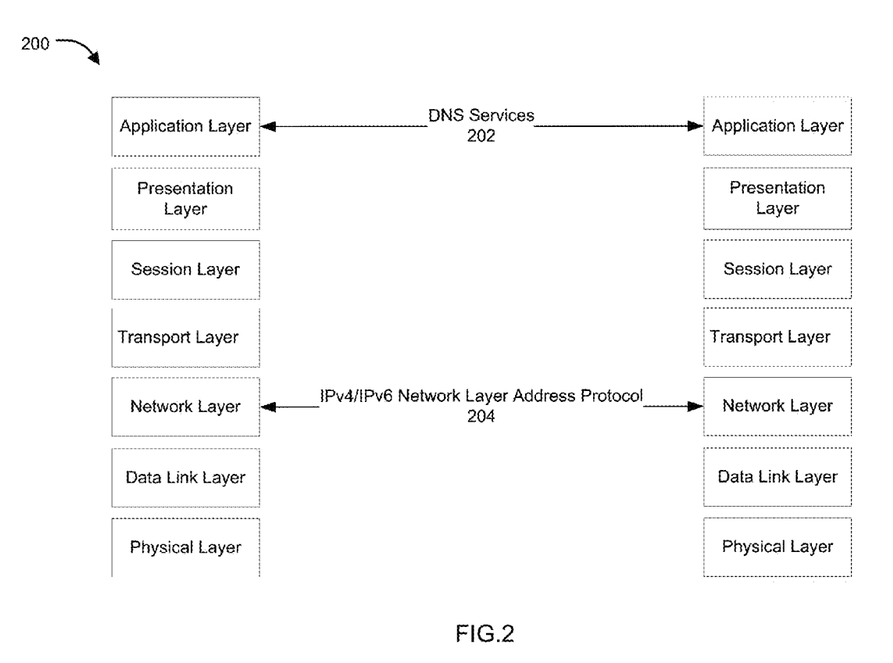
FIG. 2 illustrates an exemplary layout of OSI model showing DNS services at the application layer in accordance with an embodiment of the present disclosure.

In an aspect of the present disclosure, it is possible to implement the above-described proxy services on a network device providing DNS services, as the DNS services are provided at the application layer that is above the network layer and can therefore differentiate between IPv6 and IPv4 based packets. FIG. 2 illustrates an exemplary layout of OSI model 200 showing DNS services at the application layer in accordance with an embodiment of the present disclosure. As shown, DNS services 202, provided at the application layer of the OSI network model, are configured to receive requests from one or more client devices, process the requests, and respond back, through, say a DNS server, to the client devices. Any protocol conversion required in underlying layers can be done by/through a network device that is hosting DNS services. As IPv4/IPv6 are network layer protocols and are below the application layer, it is possible for the present disclosure to provide IP proxy services at the network device that is hosting DNS services.

Figure 3:
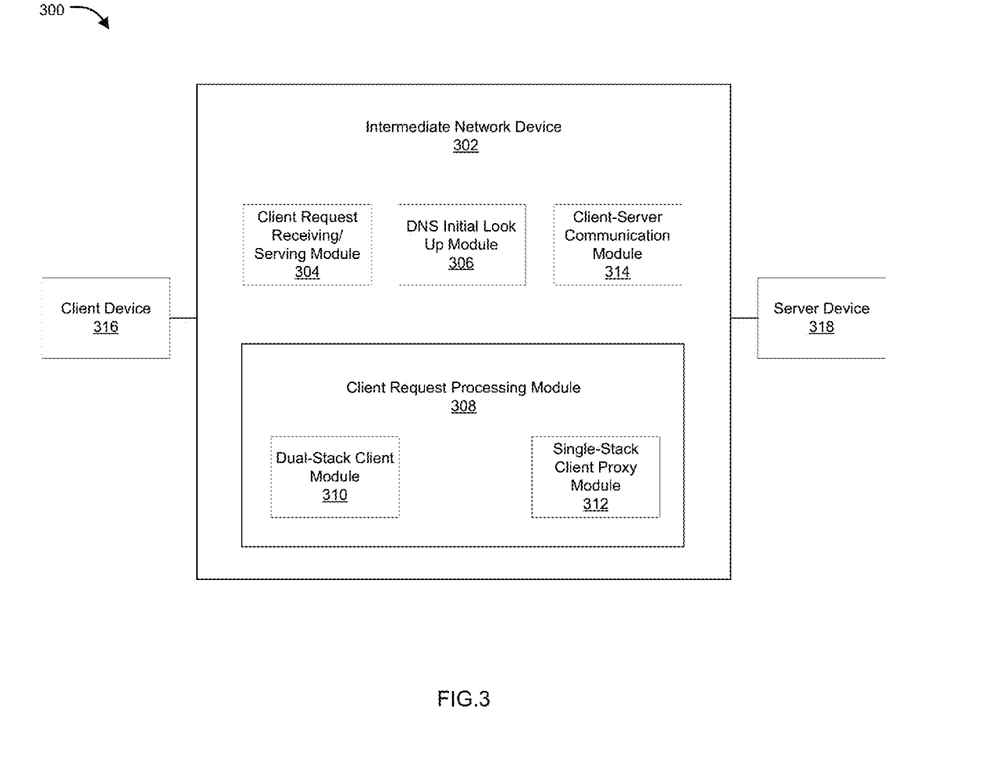
FIG. 3 illustrates exemplary functional modules of an intermediate network device performing DNS and proxy services in accordance with an embodiment of the present disclosure.

FIG. 3 illustrates exemplary functional modules 300 of an intermediate network device 302 performing DNS services and/or proxy services in accordance with an embodiment of the present disclosure. Though, in the present exemplary description, a single intermediate network device 302 is configured to perform both DNS and proxy services, those of ordinary skill in the art will appreciate that such functionality may in alternative embodiments be distributed among two or more separate intermediate devices. At the same time, device 302 of the present disclosure can be any network resource and may also be configured to perform additional functions, including, but not limited to those relating to controlling/managing network access. Any such changes in configuration/construction of intermediate device 302, which may also be referred to as network device, in the instant disclosure, is completely within the scope of the present disclosure. In another embodiment, as shown in FIG. 3, network device 302 can be logically interposed between a client device 316 and a server device 318. While in the context of the present example only a single client device 316 and a single server device 318 are shown coupled to network device 302 for sake of simplicity, those skilled in the art will appreciate that in an actual implementation, a number of client and server devices can be communicably coupled with network device 302.

In an exemplary embodiment, intermediate network device 302 can include a client request receiving/serving module 304, a DNS initial lookup module 306, a client-server communication module 314, and a client request processing module 308. Any other functional module can always be included in the device 302 and all such modules are within the scope of the present disclosure.

According to one embodiment, client request receiving/serving module 304 can be configured to receive a lookup/record/DNS query request from a client device, such as client device 316, and send the request for further processing so as to provide, in return, a DNS record including the IP address of the requested device back to client device 316. Such a client device 316 can be a dual-stack client that is compatible with both IPv4 as well as IPv6 protocols, or can be a single-stack client that is either compatible with IPv4 or with IPv6. The request can seek "A" or "AAAA" record details of a particular server/device, such as server device 318, the resources of which client device 316 may wish to access, wherein the request can be based on the type of IP protocol with which client device 316 is compliant.

According to one embodiment, DNS initial lookup module 306 can be configured to process the request and attempt to determine if a record of the type desired by the requesting device is available in the DNS database. For instance, when client device 316 requests an "A" record associated with a domain name such as "www.xyz.com", and an A record for the domain name is present in the DNS database, DNS initial lookup module 306 can conduct the initial lookup and extract the A record having the IP address of the desired domain name and send back the same to the requesting device to enable communication between client device 316 and server device 318, where the desired domain is hosted. Such communication between client 316 and server 318 can be implemented by means of client-server communication module 314, which allows both device to use their record identifiers to communicate with each other.

According to another embodiment, when network device 302, through initial lookup module 306, is not able to locate/identify/extract/retrieve the desired record type details, client request can be processed by means of client request processing module 308. In an embodiment, client request processing module 308 can include one or more sub-modules, depending on the type of client that sends the request. When the request is sent by a dual-stack client, the request can be processed, after the negative result from the initial lookup, by dual-stack client module 310, whereas, when the request is sent by a single-stack client, the request can be processed by single-stack client proxy module 312.

According to one embodiment, dual-stack client module 310 can be configured to process requests from a dual-stack client, which is inherently compatible with both IP versions and therefore can process/interact with a server irrespective of the IP format (IPv4 or IPv6) that the device 318 is compatible with. In an implementation, when DNS initial look up module 306 is not able to find a record type corresponding to the client request of the requesting device, such as client device 316, DNS initial look up module 310 can automatically retrieve a record type for the requested domain/server that is available, and send the retrieved record type to the requesting device so that the requesting device can, through client-server communication module 314, access the desired server/database/portal. For instance, when client device 316 initially request an AAAA record of server device 318, and an AAAA record for server device 318 is not found during processing performed by DNS initial look up module 306 (as a result of server device 318 being only IPv4 compliant), DNS initial look up module 310 can be configured to automatically identify an A record of server device 318 and return it to client device 316. In such a case, device 316 can then communicate with the server 318 using the A record of server device 318.

According to one embodiment, single-stack client proxy module 312 can be configured to process requests from a single-stack client, which is inherently compatible with only one of the IP formats and can therefore process/interact with a server/device having the same format. In an implementation, when DNS initial look up module 306 is not able to find a record type compatible with the client request of the requesting device, such as client device 316, single-stack client proxy module 312 can activate a proxy service, say through an application delivery controller (ADC) or IP proxy, configured to generate/assign, dynamically and/or statically, a temporary first proxy IP address that is compatible with the client request of the requesting device and return the first proxy IP address in response to the DNS query. Single-stack client proxy module 312 can further be configured to generate/assign a temporary second proxy IP address that is compatible with the IP version implemented by the requested device such that subsequent access requests from the requesting device can be received using the first proxy IP address, translated to the second proxy IP address, and then forwarded to the requested device.

In an exemplary implementation, assuming client device 316, which is IPv4 compliant, issues a request for an "A" record of a domain name and an A type record is not present in the DNS database due to the domain name being IPv6 compatible, a first IPv4 compatible proxy IP address, such as 192.168.1.15, can be returned to client device 316, and a second IPv6 compatible proxy IP address, such as 3ffe:1900:4545:3:200:f8ff:fe21:67cf, can be associated/mapped with the first proxy IP address such that client device 316 sends requests to the domain name using IP address 192.168.1.15, which then gets mapped to 3ffe:1900:4545:3:200:f8ff:fe21:67cf, and then forwarded to the actual IPv6 address of the desired domain name. Similarly, during a reply from the requested device, it can be returned back in IPv6 format, and then converted back, at network device 302 to IPv4 format and forwarded from proxy address 192.168.1.15 to the requesting device 316.

In an exemplary implementation, client-server communication module 314 can be configured to enable transactions between requesting devices and requested device, wherein such communications can be enabled when the DNS configured within network device 302 returns the record type and IP address details of the requested device to the requesting device.

Figure 4:
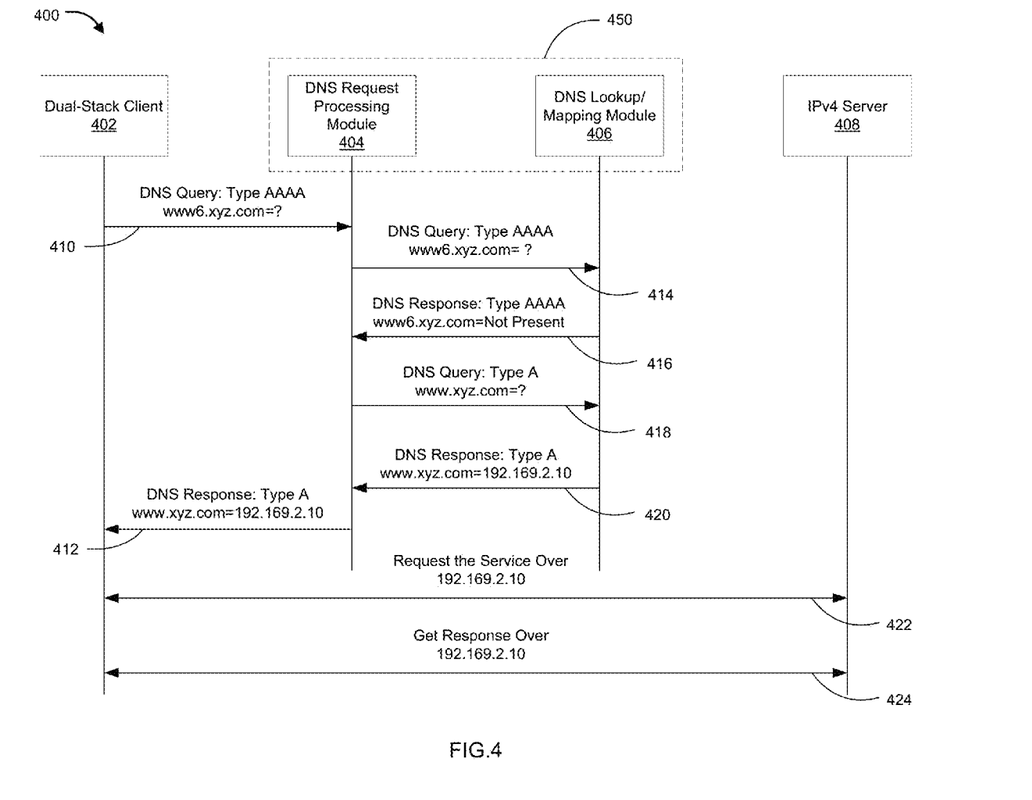
FIG. 4 illustrates an exemplary sequence flow diagram of communication between a dual-stack first client device and a single-stack second device using IPv4 in accordance with an embodiment of the present disclosure.

FIG. 4 illustrates an exemplary sequence flow diagram 400 of communications between a dual-stack client device 402 and a single-stack server device 408 compatible with IPv4 in accordance with an embodiment of the present disclosure. Those skilled in the art will appreciate that such a sequence and configuration is completely exemplary in nature. For instance, instead of an IPv4 compliant server 408, an IPv6 compliant server 408 can also be configured. As mentioned above, dual-stack client 402 is compatible with both IPv4 as well as IPv6 formats and can therefore communicate with either type of device over its different network interfaces.

In an exemplary embodiment, a network device 450 can be logically interposed between client device 402 and server 408 and may include a DNS request processing module 404 and a DNS lookup/mapping module 406. In an exemplary implementation, at 410, dual-stack client 402 sends a DNS query request to network device 450 for an AAAA record to allow dual-stack client 402 to access www6.xyz.com. At 414, DNS request processing module 404 receives the request and directs DNS lookup/mapping module 406 to check whether the AAAA record exists. As the requested server 408 is IPv4 compliant, no AAAA record is found and accordingly a "Not Present" response 416 is sent back from DNS lookup/mapping module 406 to DNS request processing module 404. Responsive to the "Not Present" response 416, DNS request processing module 404 may automatically direct DNS lookup/mapping module 406, via message 418, to check whether an "A" record is present for the domain name www.xyz.com, which is the equivalent IPv4 domain name for www6.xyz.com. In the present example, through message 420, DNS lookup/mapping module confirms that an A type record does exist for the domain name and returns same to DNS request processing module 404. At 412, DNS request processing module 404 returns the A type record information along with the IP address 192.169.2.10 to dual-stack client 402. Using the IPv4 address, dual-stack client 402 can then communicate with the server 408 through messages 422 and 424.

Those skilled in the art will appreciate that modules 404 and 406 are completely logical in nature with regard to their representations and that an actual physical implementation may include only a single network device that can access, process, map, lookup, and perform any other action required for identifying/extracting/retrieving devices record information from the DNS database.

Figure 5:
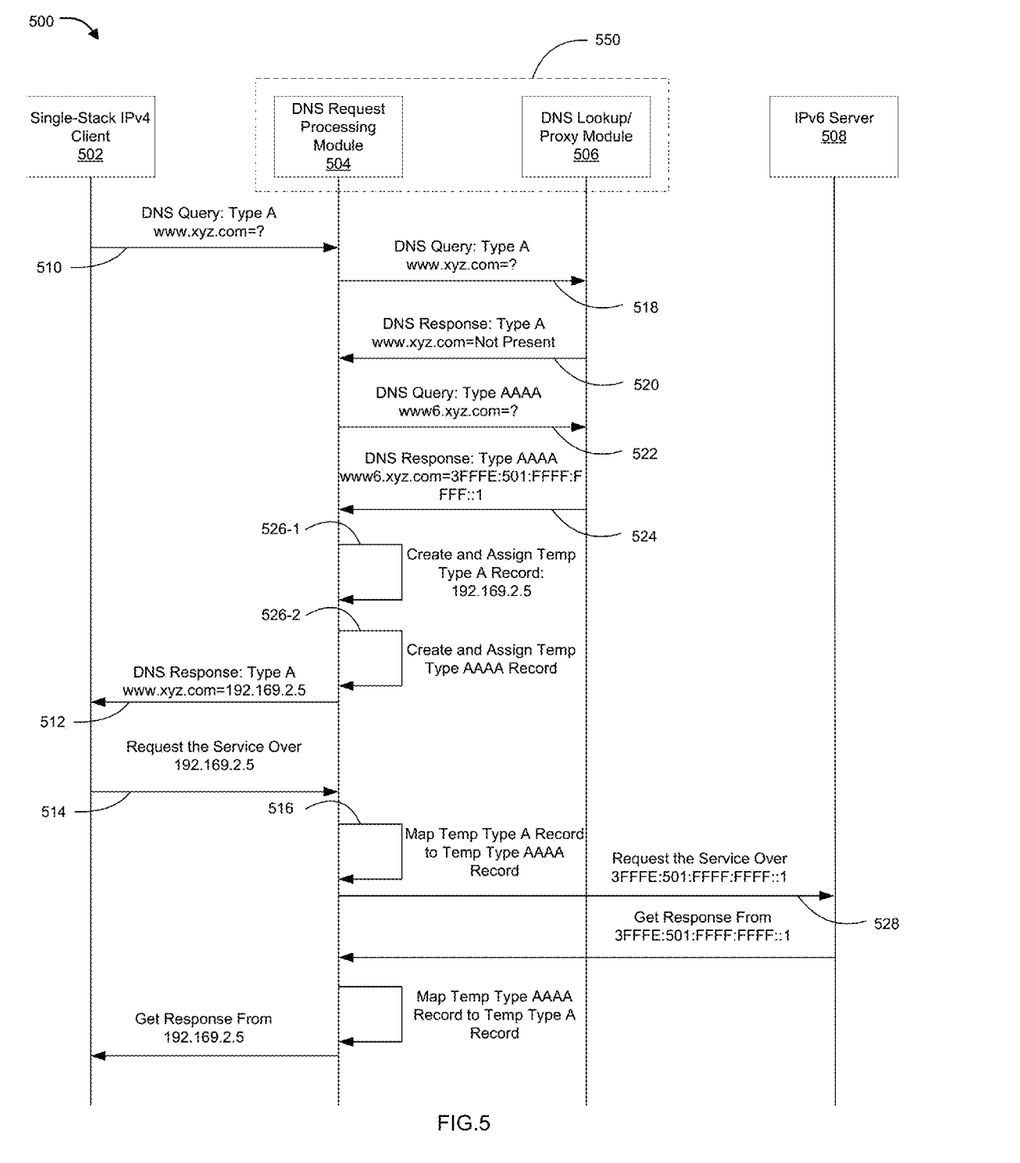
FIG. 5 illustrates an exemplary sequence flow diagram of communication between a single-stack first client device using IPv4 and a single-stack second device using IPv6 in accordance with an embodiment of the present disclosure.

FIG. 5 illustrates an exemplary sequence flow diagram 500 showing communications between a single-stack client device 502 being compatible with IPv4 format and a single-stack server device 508 being compatible with IPv6 format in accordance with an embodiment of the present disclosure. Those skilled in the art will appreciate that such a sequence and configuration is completely exemplary in nature. For example, client device 502 may be IPv6 compliant and server device 508 may be IPv4 compliant.

According to one embodiment, client device 502 can be operatively coupled with server 508 by means of a network device 550 having a DNS request processing module 504 and a DNS lookup/proxy module 506. In the context of the present example, at 510, IPv4 client 502 sends a DNS query request to obtain a type A record for domain name www.xyz.com. By way of message 518, DNS request processing module 504 directs DNS lookup/proxy module 506 to retrieve an A record for the specified domain. As the destination device/domain name www.xyz.com is IPv6 compliant, DNS lookup proxy module 506 returns a response to DNS request processing module 504 indicating that a type A record for the domain name is not present. Responsive thereto, via messages 522 and 524, an IPv6 address of the domain name www6.xyz.com can be obtained. DNS request processing module 504 can then, through 526-1, initiate a proxy service and create/assign a temporary type "A" Record having a first proxy IPv4 address of 192.169.2.5, which can be communicated as response 512 to the initial DNS query to single-stack IPv4 client 502. In an exemplary implementation, DNS request processing module 504 can further be configured to, through 526-2, create/assign another temporary type "AAAA" record having second proxy IPv6 address that is mapped to the first proxy IPv4 address such that, when client device 502, through message 514, issues a request for server resources, it uses the first proxy IPv4 address, which can then be mapped by network device 550 to the second proxy IPv6 address through 516, which can further be used to access the actual IPv6 address of server 508 at 528. The response from server 508 can accordingly be mapped back from the actual IPv6 address of server 508 to the second proxy IPv6 address to the first proxy IPv4 address and finally to the actual IP address of client 502.

In an exemplary implementation, assignment of the second proxy IP address may not be necessary, wherein once the first proxy IP address receives the request from the client device 502, the first proxy IP address can be directly mapped with the actual IPv6 address of server 508 in order to enable communication between client device 502 and server device 508.

Figure 6:
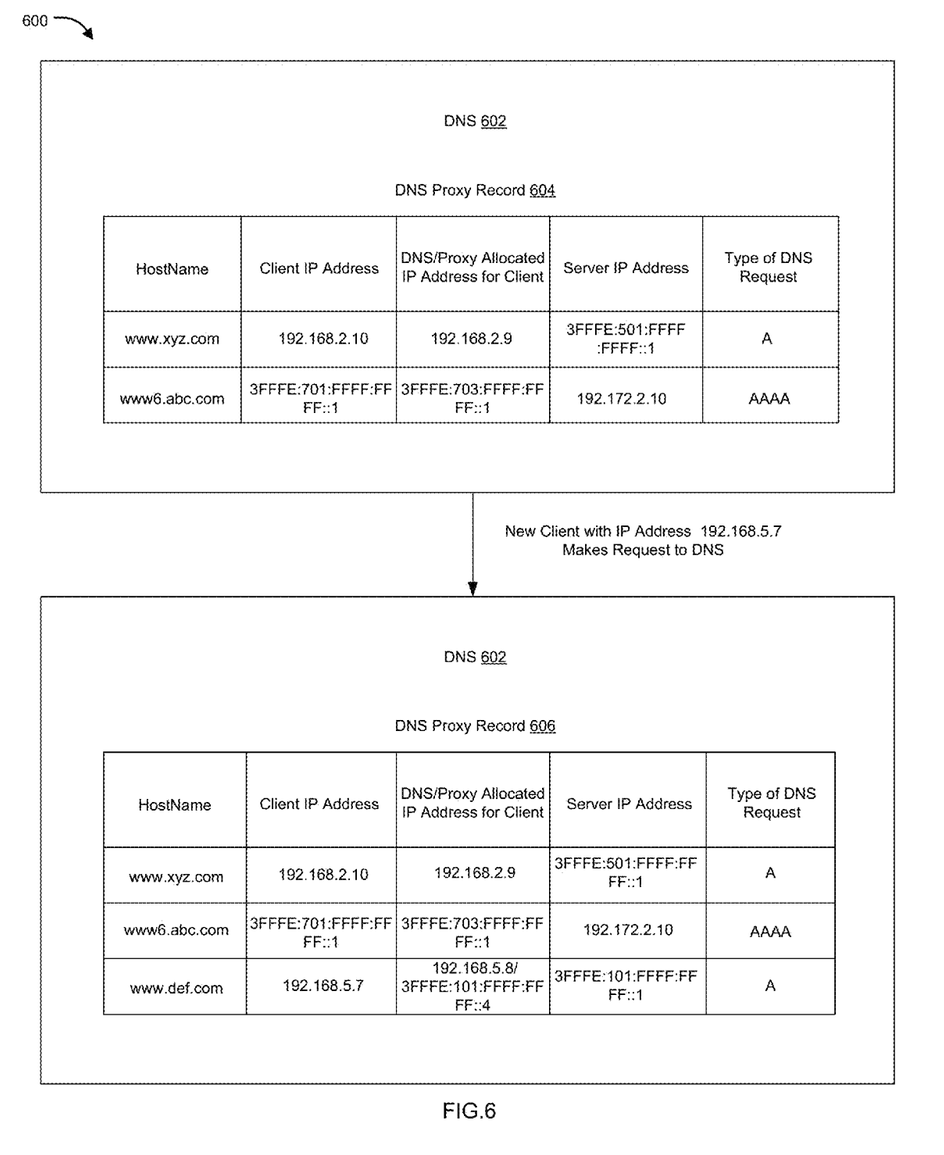
FIG. 6 illustrates an exemplary change in representation of a DNS proxy record in accordance with an embodiment of the present disclosure.

FIG. 6 illustrates an exemplary change 600 in representation of a DNS proxy record in accordance with an embodiment of the present disclosure. FIG. 6 illustrates a logical representation of a DNS record 604/606 in terms of how it is changed responsive to one or more requests/queries from client devices. In an aspect of the disclosure, DNS record can maintain/configure several details including a list of host name(s) requested by client device, client device's IP address, DNS/proxy allocated IP address for the client device, server IP address, and type of DNS request.

Those skilled in the art will appreciate that a DNS database typically includes an A or AAAA record of a requested network resource and therefore the present representation is only to conceptually illustrate how proxy addresses can be assigned to a client device and/or to the server/requested device. In accordance with an embodiment of the present disclosure, as shown, DNS proxy record 606 presents the addition of a new requested domain name www.xyz.com, "A" record of which can be expected/desired in the DNS request from the client device, wherein, in actuality, the domain name www.xyz.com is IPv6 compliant (and therefore has an AAAA record), and has a server IP address of 3FFFE:101:FFFF:FFFF::1. In such a case, network device, such as DNS 602 can assign an IPv4 compliant proxy IP address (e.g., 192.168.5.8) and return the same back to the client as part of a DNS query response so that the client device can interact with the server through the proxy IP address, which can then be mapped/translated into a compatible second proxy IP address (not shown) or directly into the correct IPv6 IP address of the server device.

Figure 7:
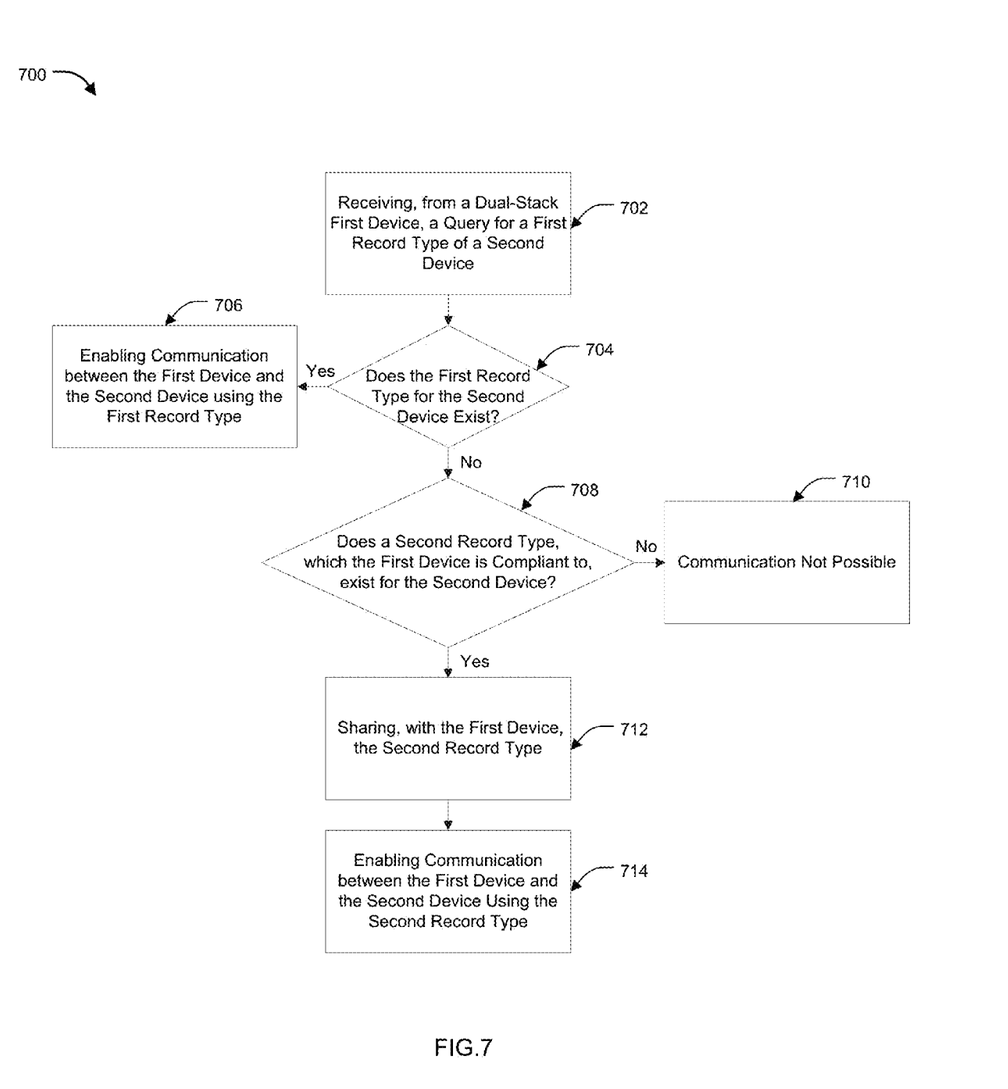
FIG. 7 illustrates an exemplary flow diagram showing communication between a dual-stack first device and an incompatible second device in accordance with an embodiment of the present disclosure.

FIG. 7 illustrates an exemplary flow diagram 700 showing communication between a dual-stack client device and a single-stack server device in accordance with an embodiment of the present disclosure. At step 702, an intermediate network device receives a DNS query from a dual-stack client device asking for a first record type of a destination/second device. At step 704, the network device checks to determine whether the first record type exists for the second device. In case, at step 704, it is determined that the first record type exists for the second device, at step 706, communication is enabled between the first device and the second device using the first record type. At step 708, in case it is determined that the first record type does not exist for the second device, the network device automatically checks to determine whether a second record type with which the requesting device is compatible, exists for the second device. At step 710, in case no second record type is found, it is concluded that no communication is possible. At step 712, on the other hand, in case the second record type is found for the second device such that the second record type is compatible with the dual-stack client device, the second record type is shared with the requesting/first device. At step 714, the first device can initiate communication with the second device using the second record type.

Figure 8:
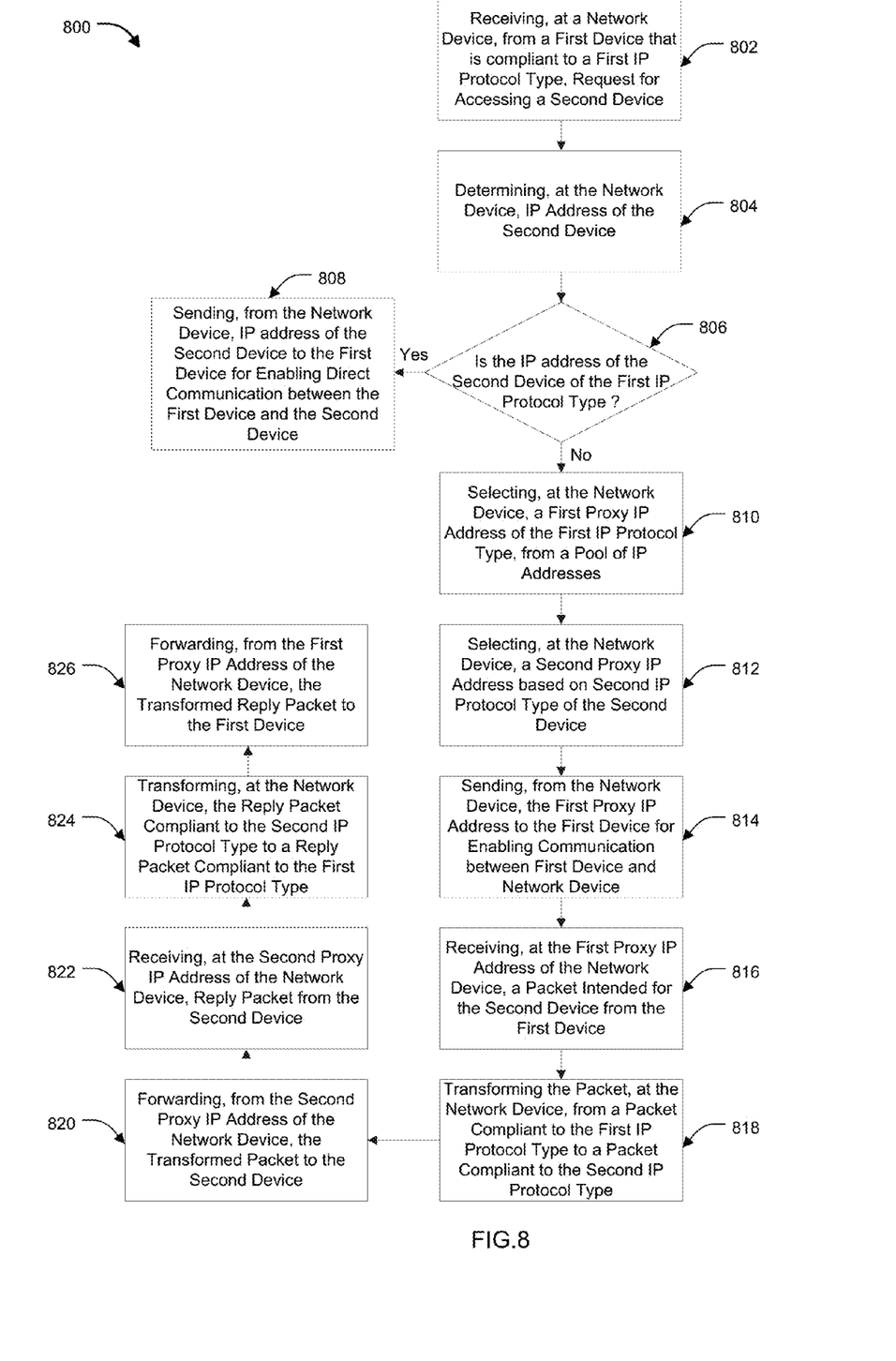
FIG. 8 illustrates an exemplary flow diagram showing communication between a single-stack first device and an incompatible second device in accordance with an embodiment of the present disclosure.

FIG. 8 illustrates an exemplary flow diagram 800 showing communication between a single-stack client device and an incompatible single-stack server device in accordance with an embodiment of the present disclosure. At step 802, an intermediate network device receives a DNS query from a first device (client device) for record details/IP address of a second device in a first IP format/type. At step 804, the network device determines the IP address of the second device, and at step 806, confirms whether the IP address format/type of the second device is same as that of the first IP format/type. At step 808, in case it is determined that the IP address of the second device is of a first IP format, the IP address of the second device can be sent back to the client/first device to enable communication. At step 810, on the other hand, in case it is determined that the IP address of the second device is not of the first IP format, the network device can assign a first proxy IP address having the first IP format/type, and at step 812, the network device can assign a second proxy IP address having the second IP format/type compatible with the second device.

At step 814, the first proxy IP address can be sent back to first device in response to the DNS query, and at step 816, the network device can receive a packet directed to the first proxy IP address from the first device intended for the second device, wherein at step 818, the packet can be transformed into a packet having the second IP format/type and sent, at step 820, using the second proxy IP address to the second device. At step 822, a reply packet is received by the network device from the second device directed to the second proxy IP address. The network device transforms, at step 824, the reply packet from the second IP format/type to first IP format/type, and using the first proxy IP address, forwards the transformed reply packet to the first device.

In an exemplary embodiment, the present method can be used to connect an IPv4 client device with an IPv6 server device, and similarly to connect a IPv6 client device with a IPv4 server device. Though the example embodiments have been explained using a client device as the first device and server device as the second device, it within the scope of the present invention to provide connectivity between the heterogeneous devices that use different network layer protocols.

Figure 9:
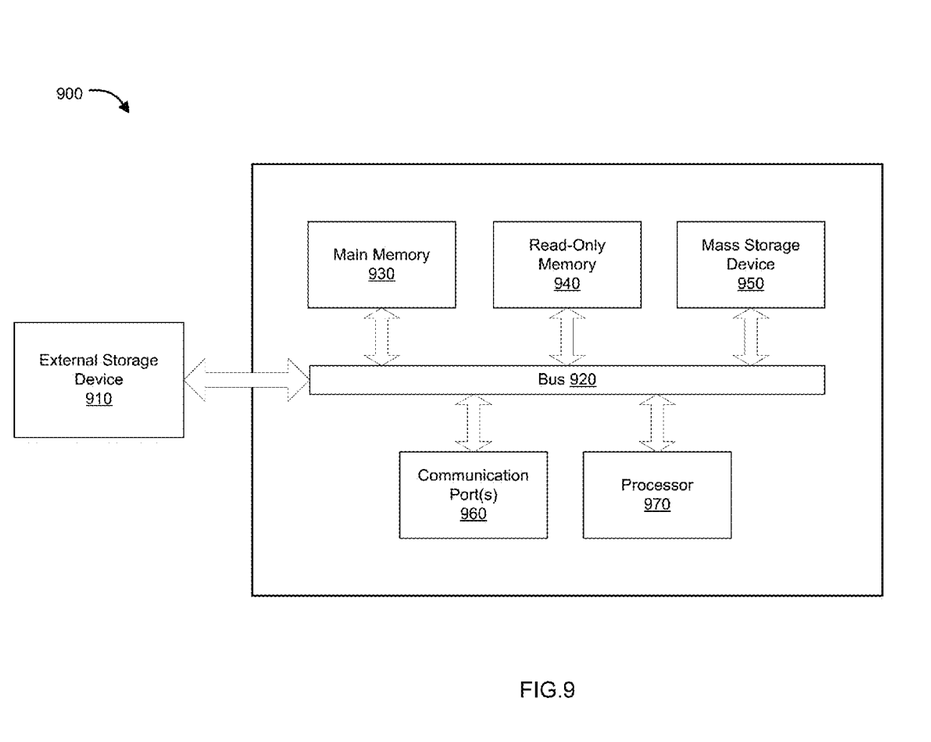
FIG. 9 is an exemplary computer system in which or with which embodiments of the present invention may be utilized.

FIG. 9 is an example of a computer system 900 with which embodiments of the present disclosure may be utilized. Computer system 900 may represent or form a part of a DNS server, a network device, a network appliance, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a read only memory 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method for realizing communication between a single-stack client device and a server device, comprising:
    receiving, by a network device, a Domain Name System (DNS) query from the single-stack client device, wherein the single-stack client device is compliant with a first version of Internet Protocol (IP);
    determining, by the network device, an IP address of the server device;
    evaluating, by the network device, whether the IP address is usable by the single-stack client device or whether the IP address is compliant with a second version of IP;
    when the IP address is determined to be usable by the single-stack client device, then enabling direct communications between the single-stack client device and the server device based on the IP address;
    when the IP address is determined to be compliant with the second version of IP, then:
        selecting, by the network device, a first proxy IP address compliant with the first version of IP;
        selecting, by the network device, a second proxy IP address compliant with the second version of IP;
        enabling communications between the single-stack client device and the server device based on communications between the single-stack client device and the network device through the first proxy IP address and using the first version of IP by sending the first proxy IP address to the single-stack client device in response to the Domain Name System (DNS) query, and enabling communications between the network device and the server device through the second proxy IP address and using the second version of IP by sending a packet to the server device from the second proxy IP address;
        receiving, by the network device, a packet from the single-stack client device intended for the server device, wherein a destination IP address field of the packet contains the first proxy IP address;
        transforming, by the network device, the packet into a transformed packet compliant with the second version of IP, wherein a source IP address field of the transformed packet contains the second proxy IP address and the destination IP address field of the transformed packet contains the server device IP address compliant with the second version of IP, and wherein the transformed packet comprises the packet sent to the server device from the second proxy IP address to enable communications between the network device and the server device;
        sending, by the network device, the transformed packet to the server device;
        receiving, by the network device, responsive to the transformed packet, a reply packet from the server device, wherein a destination IP address field of the reply packet contains the second proxy IP address;
        transforming, by the network device, the reply packet into a transformed reply packet compliant with the first version of IP, wherein a source IP address field of the transformed reply packet contains the first proxy IP address and the destination IP address field of the transformed reply packet contains the client device IP address; and
        sending, by the network device, the transformed reply packet to the single-stack client device.

2. The method of claim 1, wherein the first proxy IP address is selected by the network device from a pool of available IP addresses that are compliant with the first version of IP.

3. The method of claim 1, wherein the second proxy IP address is selected by the network device from a pool of available IP addresses that are compliant with the second version of IP.

4. The method of claim 1, wherein the network device is selected from a DNS server, a gateway device, a Unified Threat Management (UTM) device, a firewall device, a proxy server, a router, a load balancer, a local caching device, and a wireless gateway device.

5. The method of claim 1, wherein the first version of IP and the second version of IP are selected from IP version 4 (IPv4) and IP version 6 (IPv6).

6. The method of claim 5, wherein said evaluating whether the IP address is usable by the single-stack client device or whether the IP address is compliant with the second version of IP is based on whether the client device implements IPv4 or IPv6.

7. An apparatus for realizing communication between a single-stack client device and a server device, comprising:
    a network device logically interposed between the single-stack client device and the server device, the network device comprising:
    a non-transitory storage device having embodied therein instructions representing a Domain Name System (DNS) application; and
    one or more processors coupled to the non-transitory storage device and operable to execute the Domain Name System (DNS) application to perform a method comprising:

receiving a Domain Name System (DNS) request from the single-stack client device, wherein the single-stack client device is compliant with a first version of Internet Protocol (IP);

determining an IP address of the server device;

evaluating whether the IP address is usable by the single-stack client device or whether the IP address is compliant with a second version of IP;

when the IP address is determined to be usable by the single-stack client device, enabling direct communications between the single-stack client device and the server device based on the IP address;

when the IP address is determined to be compliant with the second version of IP:

selecting a first proxy IP address compliant with the first version of IP;

selecting a second proxy IP address compliant with the second version of IP; and enabling communications between the single-stack client device and the server device based on communications between the single-stack client device and the apparatus through the first proxy IP address and using the first version of IP by sending the first proxy IP address to the single-stack client device in response to the Domain Name System (DNS) query, and enabling communications between the system and the server device through the second proxy IP address and using the second version of IP by sending packets to the server device from the second proxy IP address;

receiving a packet from the single-stack client device intended for the server device, wherein a destination IP address field of the packet contains the first proxy IP address;

transforming the packet into a transformed packet compliant with the second version of IP, wherein a source IP address field of the transformed packet contains the second proxy IP address; and sending the transformed packet to the server device using the second version of IP.

8. The apparatus of claim 7, wherein the instructions are further configured to:

receive, responsive to the transformed packet, a reply packet from the server device, wherein a destination IP address field of the reply packet contains the second proxy IP address;

transform the reply packet into a transformed reply packet compliant with the first version of IP, wherein a source IP address field of the transformed reply packet contains the first proxy IP address and the destination IP address field of the transformed reply contains the client device IP address; and send the transformed reply packet to the single-stack client device.

9. The apparatus of claim 7, wherein said first proxy IP address is selected from a pool of available IP addresses that are compliant with the first version of IP.

10. The apparatus of claim 7, wherein said second proxy IP address is selected from a pool of available IP addresses that are compliant with the second version of IP.

11. The apparatus of claim 7, wherein the network device is selected from a DNS server, a gateway device, a Unified Threat Management (UTM) device, a firewall device, a proxy server, a router, a load balancer, a local caching device, and a wireless gateway device.

12. The apparatus of claim 7, wherein the first version of IP and the second version of IP are selected from IP version 4 (IPv4) and IP version 6 (IPv6).

13. The apparatus of claim 7, wherein the instructions comprise evaluating regarding whether the IP address is usable by the single-stack client device or whether the IP address is compliant with the second version of IP based on whether the client device implements IPv4 or IPv6.

* * * * *